(12) United States Patent
Jiang et al.

(10) Patent No.: US 12,537,620 B2
(45) Date of Patent: Jan. 27, 2026

(54) SIGNAL TRANSMISSION METHOD, INFORMATION SENDING METHOD, AND COMMUNICATION NODE

(71) Applicant: VIVO MOBILE COMMUNICATION CO., LTD., Dongguan (CN)

(72) Inventors: Dajie Jiang, Dongguan (CN); Kun Yang, Dongguan (CN); Xueming Pan, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 506 days.

(21) Appl. No.: 17/939,919

(22) Filed: Sep. 7, 2022

(65) Prior Publication Data

US 2023/0006764 A1  Jan. 5, 2023

Related U.S. Application Data

(63) Continuation of application No. PCT/CN2021/078586, filed on Mar. 2, 2021.

(30) Foreign Application Priority Data

Mar. 9, 2020 (CN) .......................... 202010159282.5

(51) Int. Cl.
*H04W 72/54* (2023.01)
*H04L 1/00* (2006.01)

(52) U.S. Cl.
CPC ........... *H04L 1/0025* (2013.01); *H04W 72/54* (2023.01)

(58) Field of Classification Search
CPC .......................... H04L 1/0025; H04W 72/54
See application file for complete search history.

(56) References Cited

U.S. PATENT DOCUMENTS

| | | | |
|---|---|---|---|
| 2015/0327265 A1 | 11/2015 | Lee et al. | |
| 2019/0178980 A1 | 6/2019 | Zhang et al. | |
| 2019/0181943 A1 | 6/2019 | Liang et al. | |
| 2019/0320361 A1* | 10/2019 | Uchiyama | H04W 36/033 |
| 2021/0168880 A1* | 6/2021 | Ohara | H04W 74/002 |
| 2022/0216909 A1* | 7/2022 | Bengtsson | H04B 7/145 |

(Continued)

FOREIGN PATENT DOCUMENTS

| | | |
|---|---|---|
| CN | 107359966 A | 11/2017 |
| CN | 110266352 A | 9/2019 |
| CN | 110278017 A | 9/2019 |

(Continued)

OTHER PUBLICATIONS

Extended European Search Report issued in related European Application No. 21768867.0, mailed Jun. 23, 2023, 14 pages.

(Continued)

*Primary Examiner* — Kent Krueger
(74) *Attorney, Agent, or Firm* — IPX PLLC

(57) ABSTRACT

A signal transmission method, an information sending method, and a communication node are provided. The signal transmission method includes: obtaining first information. The first information is used for indicating a transmission mode of a first node or a second node. The signal transmission method further includes transmitting a signal related to the second node according to the transmission mode corresponding to the first information.

19 Claims, 7 Drawing Sheets

(56) References Cited

U.S. PATENT DOCUMENTS

2022/0393756 A1* 12/2022 Matsumura ........ H04B 7/15514
2023/0107283 A1* 4/2023 Park ..................... H01Q 15/148
                                                                    370/329

FOREIGN PATENT DOCUMENTS

| CN | 110830097 A | 2/2020 |
| CN | 110831135 A | 2/2020 |
| EP | 4061080 A1 | 9/2022 |
| WO | 2018126802 A1 | 7/2018 |
| WO | 2018201913 A | 11/2018 |
| WO | 2018202213 A | 11/2018 |
| WO | 2021109345 A1 | 6/2021 |

OTHER PUBLICATIONS

International Search Report issued in corresponding International Application No. PCT/CN2021/078586, mailed May 26, 2021, 4 pages.
First Office Action issued in related Chinese Application No. 202010159282.5, mailed Jul. 12, 2022, 11 pages.

\* cited by examiner

SIGNAL TRANSMISSION METHOD, INFORMATION SENDING METHOD, AND COMMUNICATION NODE

CROSS-REFERENCE TO RELATED APPLICATIONS

This application is a continuation of International Application No. PCT/CN2021/078586, filed on Mar. 2, 2021, which claims priority to Chinese Patent Application No. 202010159282.5 filed on Mar. 9, 2020. The entire contents of each of the above-referenced applications are expressly incorporated herein by reference.

TECHNICAL FIELD

The present disclosure relates to the field of communications technologies, and in particular, to a signal transmission method, an information sending method, and a communication node.

BACKGROUND

With the development of communications technologies, frequencies of frequency resources adopted in some communications systems are very high. For example, in a 5th Generation (5G) communications system, a high-frequency band or a millimeter band is adopted. In this way, in the high-frequency frequency resources, obstacles in a coverage region of a cell may cause coverage holes, the strength of a wireless signal in a hole region is weak, and the communication quality is affected. This phenomenon is more common in the high-frequency band or millimeter band. However, currently, signals related to some communication nodes (for example, base stations) are often directly transmitted. For example, a base station directly transmits a signal to a terminal, which results in relatively poor reliability of signal transmission of a communication node.

SUMMARY

Embodiments of the present disclosure provide a signal transmission method, an information sending method, and a communication node, to resolve the problem of relatively poor reliability of signal transmission caused by the fact that a signal related to a communication node is often directly transmitted.

According to a first aspect, an embodiment of the present disclosure provides a signal transmission method, applicable to a first node, and including:
  obtaining first information, where the first information is used for indicating a transmission mode of the first node or a second node;
  transmitting a signal related to the second node according to the transmission mode corresponding to the first information, where
  the first node is a Large Intelligent Surfaces (LIS) node or a hypersurface node or an intelligent emitting surface node, and the second node is an upper-level first node or a base station; and the signal related to the second node includes a signal sent by the second node or a signal sent to the second node.

According to a second aspect, an embodiment of the present disclosure provides an information sending method, applicable to a second node, and including:
  sending first information, where the first information is used for indicating a transmission mode of a first node or the second node, where
  the first node is a large intelligent surface LIS node or a hypersurface node or an intelligent emitting surface node, and the second node is an upper-level first node or a base station.

According to a third aspect, an embodiment of the present disclosure provides a communication node, where the communication node is a first node, and includes:
  an obtaining module, configured to obtain first information, where the first information is used for indicating a transmission mode of the first node or a second node; and
  a transmission module, configured to transmit a signal related to the second node according to the transmission mode corresponding to the first information, where
  the first node is a large intelligent surface LIS node or a hypersurface node or an intelligent emitting surface node, and the second node is an upper-level first node or a base station;
  and the signal related to the second node includes a signal sent by the second node or a signal sent to the second node.

According to a fourth aspect, an embodiment of the present disclosure provides a communication node, where the communication node is a second node, and includes:
  a sending module, configured to send first information, where the first information is used for indicating a transmission mode of a first node or the second node, where
  the first node is a large intelligent surface LIS node or a hypersurface node or an intelligent emitting surface node, and the second node is an upper-level first node or a base station.

According to a fifth aspect, an embodiment of the present disclosure provides a communication node, where the communication node is a first node, and includes: a memory, a processor, and a program stored in the memory and executable on the processor, where the program, when executed by the processor, implements the steps of the signal transmission method according to the embodiments of the present disclosure.

According to a sixth aspect, an embodiment of the present disclosure provides a communication node, where the communication node is a second node, and includes: a memory, a processor, and a program stored in the memory and executable on the processor, where the program, when executed by the processor, implements the steps of the information sending method according to the embodiments of the present disclosure.

According to a seventh aspect, an embodiment of the present disclosure provides a computer-readable storage medium, storing a computer program, where the computer program, when executed by a processor, implements the steps of the signal transmission method according to the embodiments of the present disclosure, or the computer program, when executed by a processor, implements the steps of the information sending method according to the embodiments of the present disclosure.

According to an eighth aspect, an embodiment of the present disclosure further provides a computer software product, stored in a non-volatile storage medium, where the computer software product is configured to be executed by at least one processor to implement the steps of the signal transmission method according to the embodiments of the present disclosure, or implement the steps of the information sending method according to the embodiments of the present disclosure.

According to a ninth aspect, an embodiment of the present disclosure further provides a communication node, where the communication node is configured to perform the signal transmission method according to the embodiments of the present disclosure or the information sending method according to the embodiments of the present disclosure.

In this embodiment of the present disclosure, first information is obtained, where the first information is used for indicating a transmission mode of a first node or a second node; and a signal related to the second node is transmitted according to the transmission mode corresponding to the first information. In this way, because the first node transmits the signal related to the second node according to the transmission mode, the reliability of transmitting the signal related to the second node can be improved.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification, claims of this application, the terms "include", and any variants thereof are intended to cover a non-exclusive inclusion. For example, a process, method, system, product, or device that includes a series of steps or units is not necessarily limited to those steps or units that are clearly listed, but may include other steps or units not clearly listed or inherent to such a process, method, product, or device. In addition, "and/or" used in the specification and the claims means at least one of the connected objects. For example, A and/or B represents the following three cases: Only A exists, only B exists, and both A and B exist.

In this embodiment of the present disclosure, the term "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, use of the term "example" or "for example" or the like is intended to present a related concept in a specific manner.

The following describes the embodiments of the present disclosure with reference to the accompanying drawings. A signal transmission method, an information sending method, and a communication node provided in the embodiments of the present disclosure are applicable to a wireless communications system. The wireless communications system may be a New Radio (NR) system, or other systems such as an Evolved Long Term Evolution (eLTE) system or a Long Term Evolution (LTE) system, or a subsequent evolved communications system. Further, the signal transmission method, an information sending method, and a communication node provided in the embodiments of the present disclosure are applicable to an unlicensed band in the wireless communications system.

Figure 1:
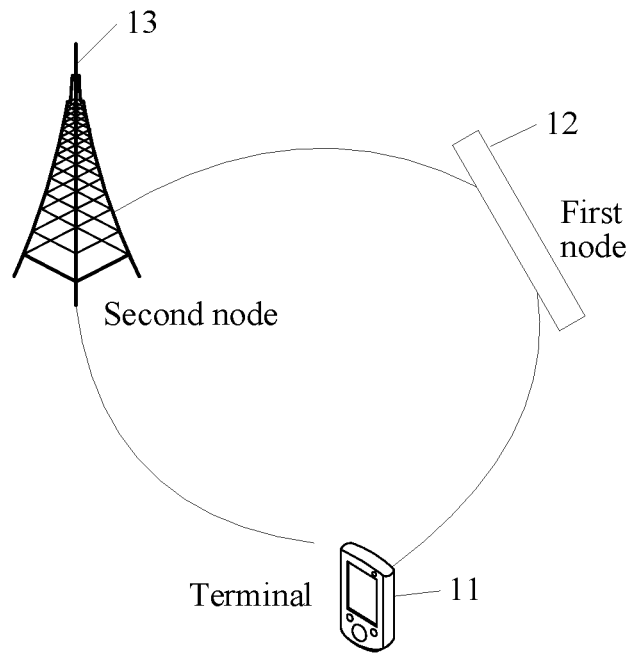
FIG. 1 is a structural diagram of a network system to which an embodiment of the present disclosure is applicable.

FIG. 1 is a structural diagram of a network system to which an embodiment of the present disclosure is applicable. As shown in FIG. 1, the network system includes a terminal 11, a first node 12, and a second node 13. The terminal 11 may be User Equipment (UE), or another terminal-side device such as a mobile phone, a tablet personal computer, a laptop computer, a Personal Digital Assistant (PDA), a Mobile Internet Device (MID), a wearable device, or a robot. It is to be noted that the specific type of the terminal 11 is not limited in the embodiments of the present disclosure. The first node 12 may be an LIS node or a hypersurface node or an intelligent emitting surface node. The second node 13 may be an upper-level first node or a base station of the first node 12.

In this embodiment of the present disclosure, the terminal 11 may communicate with the second node 13 through the first node 12. For example, the first node 12 may transmit a signal sent by the terminal 11 to the second node 13, and may also transmit a signal sent by the second node 13 to the terminal 11. When the first node 12 transmits a signal, the signal may be directly forwarded, transparently forwarded, amplified and forwarded, or modulated and sent, or the like. This is not limited. In this embodiment of the present disclosure, in some scenarios, the terminal 11 may directly communicate with the second node 13.

Moreover, in this embodiment of the present disclosure, the LIS node or hypersurface node or intelligent emitting surface node is an emerging artificial material device. The LIS node or hypersurface node or intelligent emitting surface node may dynamically/semi-statically adjust its own electromagnetic properties, affecting a reflection/refraction behavior of electromagnetic waves that enter the node. In addition, the LIS node or hypersurface node or intelligent emitting surface node may manipulate a reflected wave/refracted signal of an electromagnetic signal to implement functions such as beam scanning/beamforming.

Figure 2:
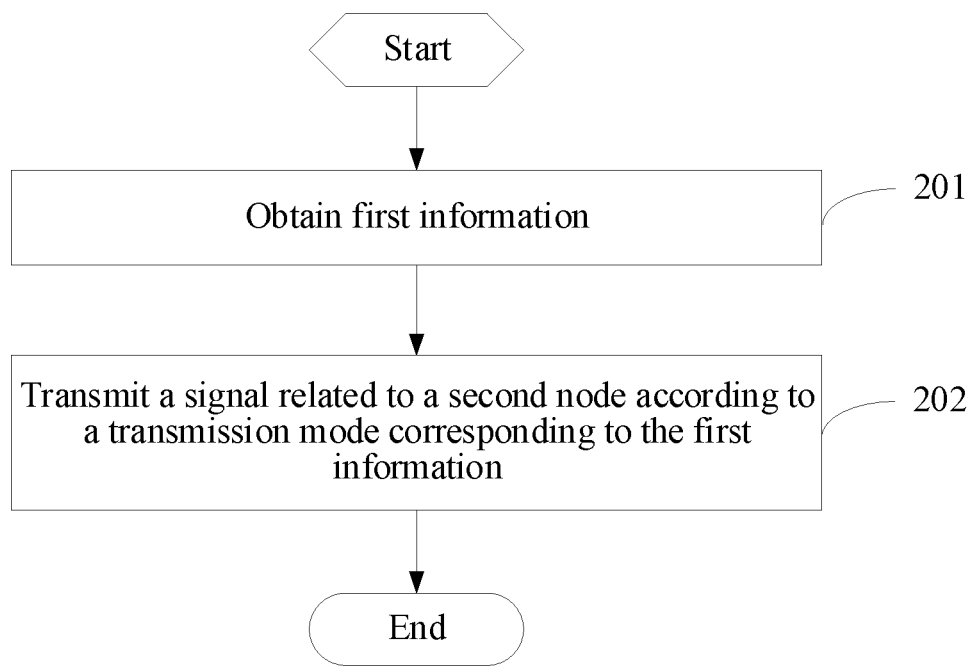
FIG. 2 is a flowchart of a signal transmission method according to an embodiment of the present disclosure.

FIG. 2 is a flowchart of a signal transmission method according to an embodiment of the present disclosure. The method is applicable to a first node. As shown in FIG. 2, the method includes the following steps.

Step 201. Obtain first information, where the first information is used for indicating a transmission mode of the first node or a second node.

The obtaining first information may be receiving the first information sent by the second node. In addition, the first information may be transmitted between nodes through a radio interface or a type of wired interface.

The first node is an LIS node or a hypersurface node or an intelligent emitting surface node, and the second node is an upper-level first node or a base station.

The upper-level first node may be the upper-level first node of the signal transmitted by the first node. For example, for an uplink signal, the upper-level first node is an LIS node or a hypersurface node or an intelligent emitting surface node that transmits the uplink signal to the first node. For a downlink signal, the upper-level first node is an LIS node or a hypersurface node or an intelligent emitting surface node that transmits the downlink signal to the first node.

The LIS (or the hypersurface node or the intelligent emitting surface node) includes an artificial surface at a front end and a control module at a back end. The artificial surface at the front end includes artificial device units that are densely arranged. Device characteristics of a device unit are affected by a control signal/bias voltage of the device. Different control signals/bias voltages correspond to different device characteristics such as reflection coefficients/refraction coefficients. Changes in reflection coefficients/refraction coefficients affect a phase and/or intensity of the reflected signal/refracted signal. Microscopically, each device unit produces an independent reflected signal/refracted signal, and macroscopically, these signals are superimposed together to implement manipulation of electromagnetic waves. The control signal/bias voltage is provided by the control module at the back end.

If the first node or the second node is an LIS node, the transmission mode indicated by the first information may correspond to one or several sets of reflection coefficients/refraction coefficients, or correspond to one or several sets of configurations of the control signal/bias voltage, or LIS forwarding signals corresponding to different transmission modes have different beams.

If the first node or the second node is a base station, the transmission mode indicated by the first information may correspond to one or several sets of configurations of reference signals or synchronization signals, or signals corresponding to different transmission modes have different beams.

Further, the transmission mode adopted in information transmission may be determined according to the first information, that is, information is transmitted according to the transmission mode corresponding to the first information. For example, transmission is directly performed according to the transmission mode of the first node indicated by the first information, or the transmission mode of the first node is determined and the transmission is performed according to the transmission mode of the second node indicated by the first information.

Step 202. Transmit a signal related to the second node according to the transmission mode corresponding to the first information, where the transmission mode corresponding to the first information may be the transmission mode of the first node indicated by the first information. In some embodiments, the transmission mode indicated by the first information is directly adopted in a case that the first information indicates the transmission mode of the first node.

In some embodiments, the transmission mode corresponding to the first information may be: determining the transmission mode of the first node according to the transmission mode of the second node indicated by the first information. In some embodiments, in a case that the first information indicates the transmission mode of the second node, the transmission mode of the first node is determined according to the transmission mode of the second node, where a mapping relationship between the transmission mode of the second node and the transmission mode of the first node may be pre-configured or predefined in a protocol, or the like. The mapping relationship is transmitted between the first node and the second node.

In this embodiment of the present disclosure, "Inoperative" is also a transmission mode, such as an inoperative transmission mode. However, in an operative transmission mode, different transmission modes correspond to different beams, that is, different beams are adopted in different transmission modes for transmission.

the signal related to the second node includes a signal sent by the second node or a signal sent to the second node.

In a case that the signal includes a signal sent by the second node, the signal may be a signal sent by the second node to the terminal, and the first node transmits the signal to the terminal. For example, after the first node receives the signal sent by the second node, the first node forwards the signal to the terminal.

In a case that the signal includes a signal sent to the second node, the signal may be a signal sent by the terminal to the second node, and the first node transmits the signal to the second node. For example, after the first node receives the signal sent by the terminal, the first node forwards the signal to the second node.

The forwarding may be direct forwarding, amplified forwarding, deflected forwarding, phase-changing forwarding, transparent forwarding, or the like.

In this embodiment of the present disclosure, through the foregoing steps, the first node may transmit the signal related to the second node according to the transmission mode, so that the reliability of transmitting the signal related to the second node can be improved.

In an implementation, the transmission mode is associated with a beam, or the transmission mode is associated with a transmission configuration indicator state.

In some embodiments, different transmission modes are associated with different beams, or different transmission modes are associated with different transmission configuration indicator states. In this way, the signal may be transmitted in different beams or transmission configuration indicator states.

In an implementation, the first information is used for indicating at least one of the following transmission modes of the first node or the second node:

a periodic transmission mode and an aperiodic transmission mode.

The periodic transmission mode may be used for indicating at least one of at least one transmission mode and an inoperative transmission mode in one period. The period may be referred to as any period.

In addition, in different periods, the transmission modes of the first node may be the same.

The inoperative transmission mode may be a mode in which no transmission is performed or a beam is turned off.

In addition, the aperiodic transmission mode may be used for indicating a transmission mode or an inoperative transmission mode.

In the aperiodic transmission mode, an end time of each transmission mode may be indication information for obtaining a next aperiodic transmission mode. For example, if the first information indicates an aperiodic first transmission mode, the transmission mode does not end until a next information update.

In some embodiments, the first information is further used for indicating time information of at least a part of the transmission mode, or the first information is further used for indicating time information of the inoperative transmission mode.

For example, the first information indicates time information of part or all of the transmission modes in one period.

The time information may represent at least one of a start time, a duration, and an end time of the transmission mode.

In some embodiments, the first information includes N groups of bits, the one period includes N time units, each group of bits is used for indicating a transmission mode or an inoperative transmission mode in a corresponding time unit, each group of bits includes one or more bits, and N is an integer greater than or equal to 1.

The N groups of bits may correspond to a quantity of transmission modes in one period.

For example, there are two transmission modes, 0 represents a transmission mode 1, and 1 represents a transmission mode 2; and a manner of a bitmap is adopted in the first information. For example, the first information is 11011. The position of each bit represents a moment, and 11011 represents that in five time units, the transmission mode 1 is used in the first time unit, the second time unit, the fourth time unit, and the fifth time unit, and the transmission mode 2 is used in the third time unit.

Figure 3:
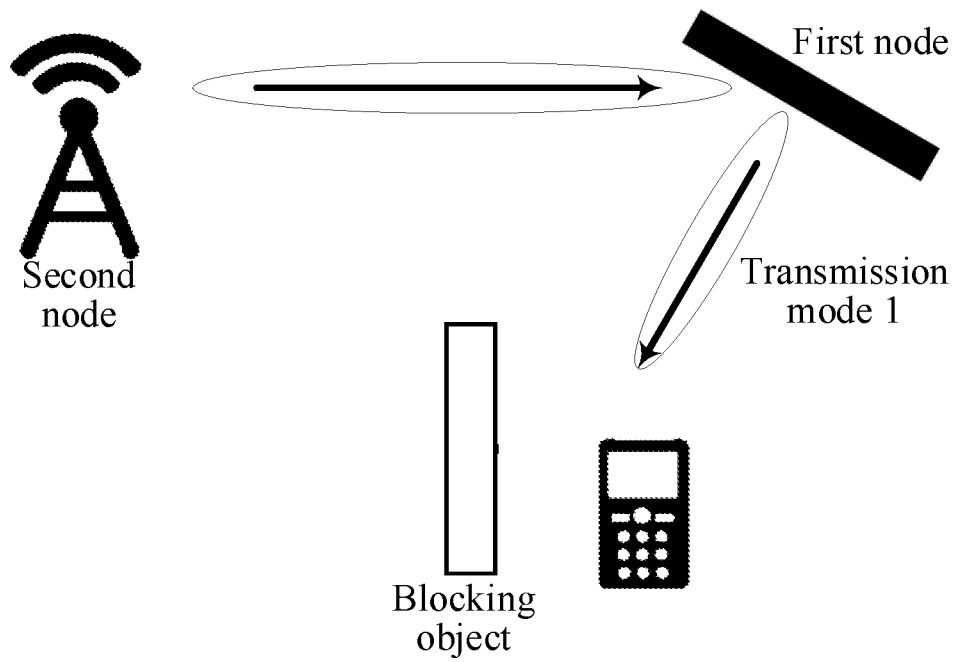
FIG. 3 is a schematic diagram of an application scenario according to an embodiment of the present disclosure.
Figure 4:
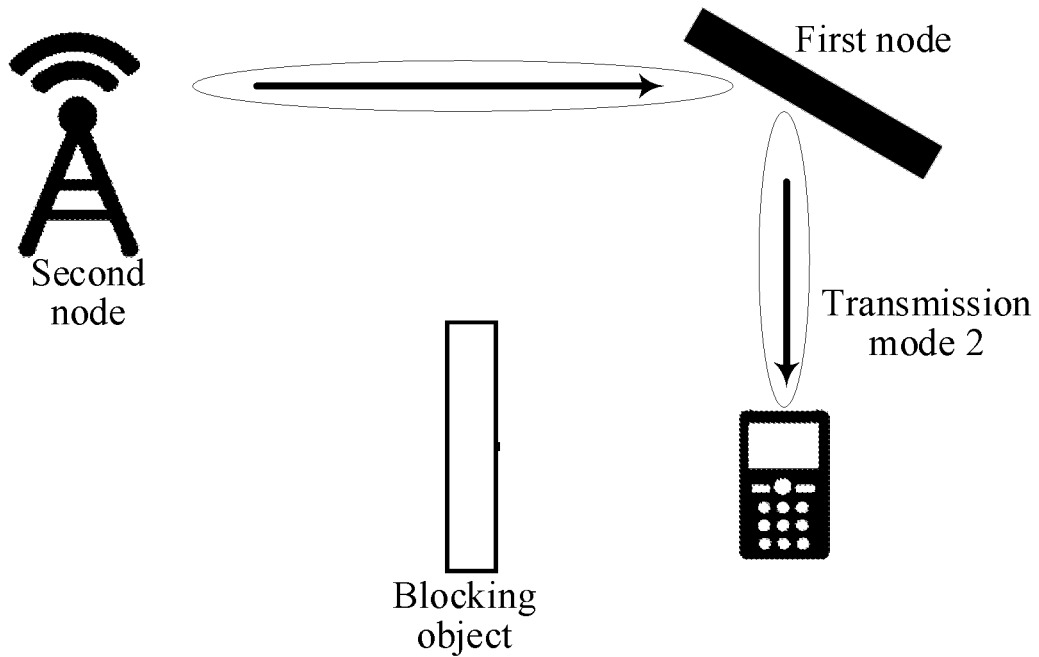
FIG. 4 is a schematic diagram of another application scenario according to an embodiment of the present disclosure.
Figure 5:
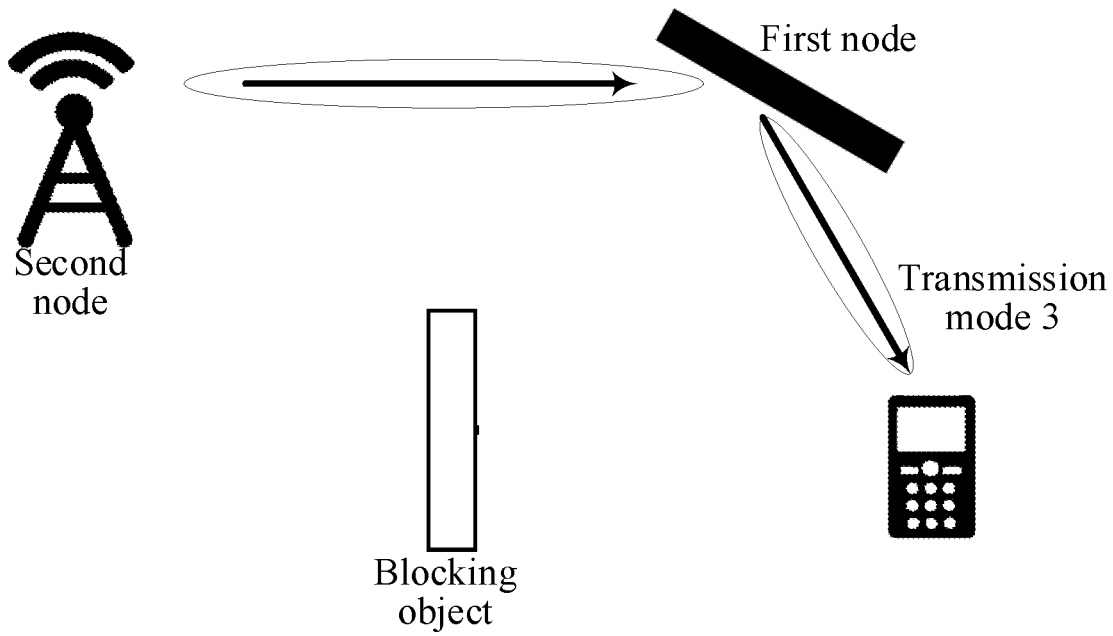
FIG. 5 is a schematic diagram of another application scenario according to an embodiment of the present disclosure.

In another example, there are three transmission modes, 00 represents a transmission mode 1, 01 represents a transmission mode 2, and 10 represents a transmission mode 3. a manner of a bitmap is used in the first information. For example, the first information is 000110. The position of every 2 bits represents a moment, and 000110 represents that in three time units, the transmission mode 1, the transmission mode 2, and the transmission mode 3 are respectively used in the first time unit, the second time unit, and the third time unit. For details, reference may be made to FIG. 3, FIG. 4, and FIG. 5. The transmission mode 1, the transmission mode 2, and the transmission mode 3 are respectively used in the first time unit, the second time unit, and the third time unit.

The N groups of bits can accurately indicate the time information of the transmission mode, and the overhead of signaling transmission can be reduced.

In addition, in one period, if there is a time resource for which the transmission mode is not explicitly indicated, a default or predefined transmission mode is used in the first node. For example, the default mode is the inoperative transmission mode. This is not limited, and another transmission mode may be used.

It should be noted that, in this embodiment of the present disclosure, in the periodic transmission mode, a start time and a length of one period may be notified by the second node or pre-defined. For example, the start time and the length of the period are notified in the first information.

In some embodiments, in the periodic transmission mode, the at least one transmission mode includes a transmission mode of at least one downlink time resource, and further includes a transmission mode of an uplink time resource corresponding to the at least one downlink time resource, where the transmission mode of the uplink time resource is a transmission mode in the transmission mode of the at least one downlink time resource.

The time resource may be a slot, a subframe, or the like.

For example, using a frequency band FR2 and a TDD system as an example, the above at least one transmission mode may be shown in Table 1:

TABLE 1

| slot | DL | DL | DL | DL | UL | DL | DL | DL | DL | UL |
|---|---|---|---|---|---|---|---|---|---|---|
| Transmission mode | 0 | 0 | 1 | 2 | 1 | 0 | 0 | 1 | 2 | 2 |
| Bit indication | 00 | 00 | 01 | 10 | 01 | 00 | 00 | 01 | 10 | 10 |

In Table 1, transmission modes (inoperative transmission modes) corresponding to a downlink slot and an uplink slot in one period may be matched. For example, if there are the transmission mode 1 and the transmission mode 2 in the downlink slot in one period, there are also the transmission mode 1 and the transmission mode 2 in the downlink slot.

10 slots are used as one period, information sent by the second node 1 to the first node is: 00 00 01 10 01 00 00 01 10 10. The transmission mode represented by 00 is off That is, a node 2 may be turned off in this case. A beam of a node 1 does not point in a direction of the node 2 in this case. For example, the transmission modes of the first node and the second node may be shown in FIG. 6. It should be noted that the transmission mode of the second node is represented by 2-X, where 2-0 represents a transmission mode 0 of the second node, 2-1 represents a transmission mode 1 of the second node, and 2-2 represents a transmission mode 2 of the second node. The transmission mode of the first node is represented by 1-X, where 1-1 represents the transmission mode 1 of the second node, and 1-2 represents the transmission mode 1 of the second node.

In this implementation, the transmission mode of the downlink time resource may be matched with the transmission mode of the uplink time resource, so that uplink feedback can be effectively transmitted. For example, a Physical Downlink Shared Channel (PDSCH) of the second node and an ACK/NACK corresponding to the physical downlink shared channel need to be transmitted by the first node operating in the same transmission mode.

In an implementation, before the obtaining first information, the method further includes:

sending second information, where the second information is used for indicating a transmission mode expected by the first node.

The sending the second information may be understood as that the first node feeds back a transmission mode expected by the first node to the second node.

After receiving the first information, the second node may determine the transmission mode of the first node and/or determine the transmission mode of the second node according to the transmission mode expected by the first node. That is, the transmission mode indicated by the first information may be determined by the second node based on the transmission mode indicated by the second information.

For example, the second node may directly determine that the transmission mode indicated by the second information is the transmission mode of the first node indicated by the first information, or the second node adjusts the transmission mode indicated by the second information to obtain the transmission mode of the first node indicated by the first information.

Further, the second node may also adjust the transmission mode of the second node according to the transmission mode expected by the first node.

In this implementation, because the first node feeds back the transmission mode expected by the first node, the transmission mode of the first node may be more matched with the first node, to improve transmission performance of the first node. For example, the first node may determine the transmission mode expected by the first node according to related information of the first node. For example, the transmission mode expected by the first node is determined according to information such as distribution of access users on each beam of the first node.

In addition, the transmission mode indicated by the second information may be one of a predefined transmission mode set, or the transmission mode indicated by the second information may be a new or temporarily obtained transmission mode.

Further, the second information may further indicate time information of the transmission mode expected by the first node. In some embodiments, for the transmission mode expected by the first node indicated by the second information, reference may be made to the implementations in which the first information indicates the transmission mode of the second node, which is not repeated herein. For example, the second information is used for indicating at least one of the following transmission modes expected by the first node: a periodic transmission mode and an aperiodic transmission mode.

In this embodiment of the present disclosure, the first information may be actively sent by the second node to the first node, to assist the first node in completing forwarding of data related to the second node.

In an implementation, the method further includes:
adjusting the transmission mode of the first node to the transmission mode corresponding to the first information according to the first information.

The adjusting, according to the first information, the transmission mode of the first node to the transmission mode corresponding to the first information may be: adjusting the transmission mode of the first node to the transmission mode indicated by the first information in a case that the first information indicates the transmission mode of the first node; or the adjusting, according to the first information, the transmission mode of the first node to the transmission mode corresponding to the first information may be: adjusting the transmission mode of the first node according to the transmission mode of the second node in a case that the first information indicates the transmission mode of the second node.

The adjusted time may be a time notified by the second node, or an offset between the adjusted time and a receiving time of the first information is equal to a target time.

The second node may be notified by using the first information, and the target time may be notified by using the second node, or agreed in a protocol, or the like.

In an implementation, the transmission mode corresponding to the first information includes:
the transmission mode of the first node corresponding to the transmission mode of the second node indicated by the first information determined according to a mapping relationship, where
the mapping relationship is a mapping relationship between the transmission mode of the second node and the transmission mode of the first node.

Using an example in which the time resource is a slot, the mapping relationship may be shown in Table 2:

TABLE 2

| slot | DL | DL | DL | DL | UL | DL | DL | DL | DL | UL |
|---|---|---|---|---|---|---|---|---|---|---|
| Transmission mode of a first node | 0 | 0 | 1 | 2 | 1 | 0 | 0 | 1 | 2 | 2 |
| Transmission mode of a second node | 0 | 1 | 2 | 2 | 2 | 0 | 1 | 2 | 2 | 2 |

In this implementation, the transmission mode of the first node can be accurately determined through the mapping relationship.

Figure 6:
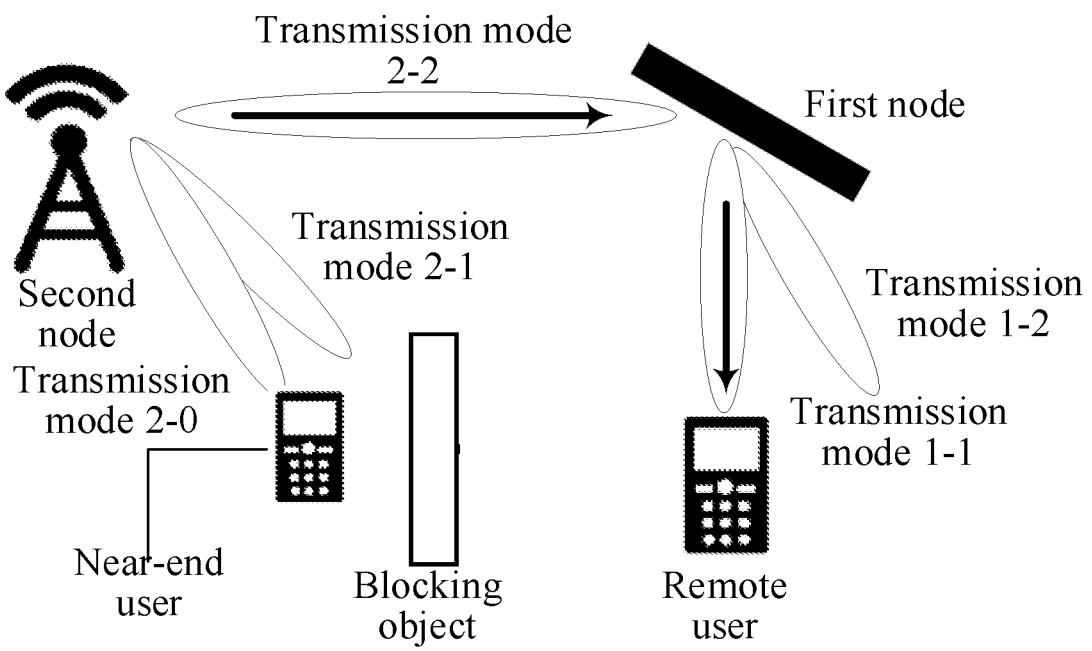
FIG. 6 is a schematic diagram of another application scenario according to an embodiment of the present disclosure.

It should be noted that, in this embodiment of the present disclosure, the mapping relationship may be configured by the second node for the first node or agreed in a protocol. In addition, the transmission mode of the first node and the transmission mode of the second node are different. For example, the transmission mode 1 of the first node is not related to the transmission mode 2 of the second node, but both maintain their own sequence numbers of transmission modes. For example, as shown in FIG. 6, the transmission mode 1 (1-1 in the accompanying drawings) of the first node corresponds to the transmission mode 2 (2-2 in the accompanying drawings) of the second node. In addition, these correspondences are not fixed. For example, the mapping relationship may be shown in Table 2, including the mapping relationship in each time resource, and in some time resources, a correspondence between the transmission mode of the first node and the transmission mode of the second node in different time resources is different. For example, in the first uplink resource, the transmission mode 1 of the first node corresponds to the transmission mode 2 of the second node, and in the second uplink resource, the transmission mode 2 of the first node corresponds to the transmission mode 2 of the second node.

In this embodiment of the present disclosure, first information is obtained, where the first information is used for indicating a transmission mode of a first node or a second node; and a signal related to the second node is transmitted according to the transmission mode corresponding to the first information. In this way, because the first node transmits the signal related to the second node according to the transmission mode, the reliability of transmitting the signal related to the second node can be improved.

Figure 7:
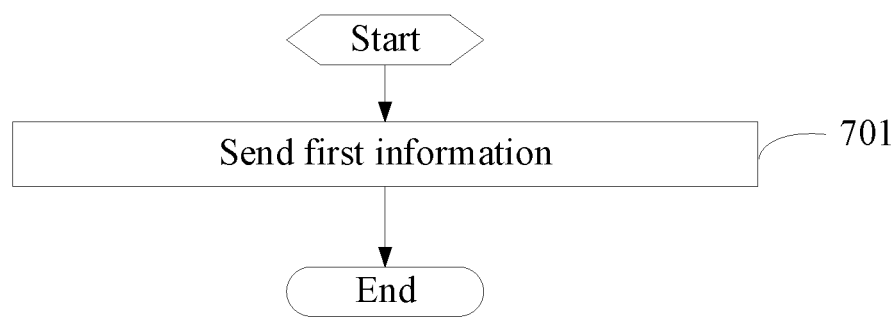
FIG. 7 is a flowchart of an information sending method according to an embodiment of the present disclosure.

FIG. 7 is a flowchart of an information sending method according to an embodiment of the present disclosure. The method is applicable to a second node. As shown in FIG. 7, the method includes the following steps.

Step 701. Send first information, where the first information is used for indicating a transmission mode of a first node or the second node, where
the first node is a large intelligent surface LIS node or a hypersurface node or an intelligent emitting surface node, and the second node is an upper-level first node or a base station.

In some embodiments, the first information is used for indicating at least one of the following transmission modes of the first node or the second node:
a periodic transmission mode and an aperiodic transmission mode.

In some embodiments, the periodic transmission mode is used for indicating at least one of at least one transmission mode and an inoperative transmission mode in one period; or
the aperiodic transmission mode is used for indicating a transmission mode or an inoperative transmission mode.

In some embodiments, the transmission mode is associated with a beam, or the transmission mode is associated with a transmission configuration indicator state.

In some embodiments, the first information is further used for indicating time information of at least a part of the transmission mode, or the first information is further used for indicating time information of the inoperative transmission mode.

In some embodiments, the first information includes N groups of bits, the one period includes N time units, each group of bits is used for indicating a transmission mode or an inoperative transmission mode in a corresponding time unit, each group of bits includes one or more bits, and N is an integer greater than or equal to 1.

In some embodiments, the at least one transmission mode includes a transmission mode of at least one downlink time resource, and further includes a transmission mode of an uplink time resource corresponding to the at least one downlink time resource, where the transmission mode of the uplink time resource is a transmission mode in the transmission mode of the at least one downlink time resource.

In some embodiments, before the sending first information, the method further includes:
receiving second information, where the second information is used for indicating a transmission mode expected by the first node.

In some embodiments, the transmission mode indicated by the first information is determined by the second node based on the transmission mode indicated by the second information.

In some embodiments, the method further includes:
adjusting the transmission mode of the second node according to the first information.

In some embodiments, the adjusted time is a time determined by the second node, or an offset between the adjusted time and a sending time of the first information is equal to a target time.

In some embodiments, the transmission mode of the second node indicated by the first information corresponds to the transmission mode adopted by the first node to transmit a signal related to the second node, where
the signal related to the second node includes a signal sent by the second node or a signal sent to the second node.

It should be noted that this embodiment is an implementation of a corresponding first node in the embodiment shown in FIG. 2. For an implementation of this embodiment, reference may be made to related descriptions in the embodiment shown in FIG. 2. To avoid repeated descriptions, details are not repeated in this embodiment. In this embodiment, the reliability of signal transmission can also be improved.

Figure 8:
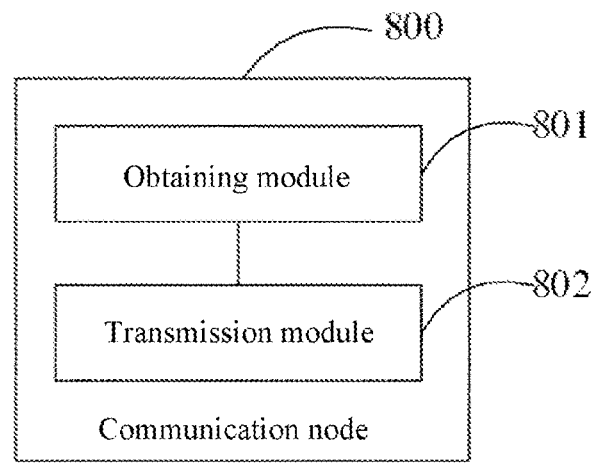
FIG. 8 is a structural diagram of a communication node according to an embodiment of the present disclosure.

FIG. 8 is a structural diagram of a communication node according to an embodiment of the present disclosure. The communication node is a first node. As shown in FIG. 8, the communication node 800 includes:

an obtaining module 801, configured to obtain first information, where the first information is used for indicating a transmission mode of the first node or a second node; and
a transmission module 802, configured to transmit a signal related to the second node according to the transmission mode corresponding to the first information, where
the first node is a large intelligent surface LIS node or a hypersurface node or an intelligent emitting surface node, and the second node is an upper-level first node or a base station;
and the signal related to the second node includes a signal sent by the second node or a signal sent to the second node.

In some embodiments, the first information is used for indicating at least one of the following transmission modes of the first node or the second node:
a periodic transmission mode and an aperiodic transmission mode.

In some embodiments, the periodic transmission mode is used for indicating at least one of at least one transmission mode and an inoperative transmission mode in one period; or
the aperiodic transmission mode is used for indicating a transmission mode or an inoperative transmission mode.

In some embodiments, the transmission mode is associated with a beam, or the transmission mode is associated with a transmission configuration indicator state.

In some embodiments, the first information is further used for indicating time information of at least a part of the transmission mode, or the first information is further used for indicating time information of the inoperative transmission mode.

In some embodiments, the first information includes N groups of bits, the one period includes N time units, each group of bits is used for indicating a transmission mode or an inoperative transmission mode in a corresponding time unit, each group of bits includes one or more bits, and N is an integer greater than or equal to 1.

In some embodiments, the at least one transmission mode includes a transmission mode of at least one downlink time resource, and further includes a transmission mode of an uplink time resource corresponding to the at least one downlink time resource, where the transmission mode of the uplink time resource is a transmission mode in the transmission mode of the at least one downlink time resource.

Figure 9:
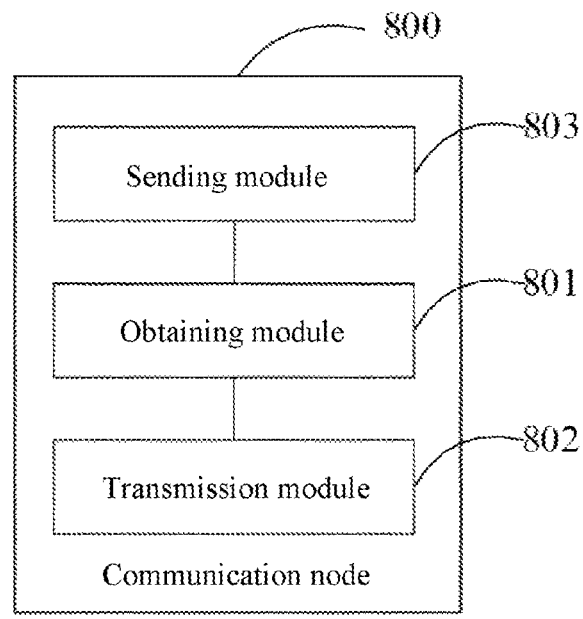
FIG. 9 is a structural diagram of another communication node according to an embodiment of the present disclosure.

In some embodiments, as shown in FIG. 9, the communication node 800 further includes:
a sending module 803, configured to send second information, where the second information is used for indicating a transmission mode expected by the first node.

In some embodiments, the transmission mode indicated by the first information is determined by the second node based on the transmission mode indicated by the second information.

Figure 10:
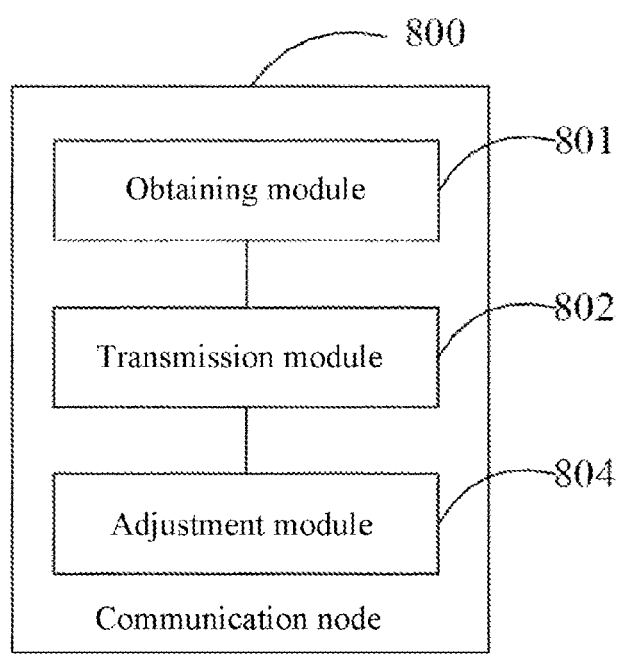
FIG. 10 is a structural diagram of another communication node according to an embodiment of the present disclosure.

In some embodiments, as shown in FIG. 10, the communication node 900 further includes:
an adjustment module 904, configured to adjust the transmission mode of the first node to the transmission mode corresponding to the first information according to the first information.

In some embodiments, the adjusted time is a time notified by the second node, or an offset between the adjusted time and a receiving time of the first information is equal to a target time.

In some embodiments, the transmission mode corresponding to the first information includes:
the transmission mode of the first node corresponding to the transmission mode of the second node indicated by the first information determined according to a mapping relationship, where
the mapping relationship is a mapping relationship between the transmission mode of the second node and the transmission mode of the first node.

The terminal provided in this embodiment of the present disclosure can implement the processes implemented by the first node in the method embodiment in FIG. 2. To avoid repetition, details are not repeated herein. In addition, the reliability of signal transmission can be improved.

Figure 11:
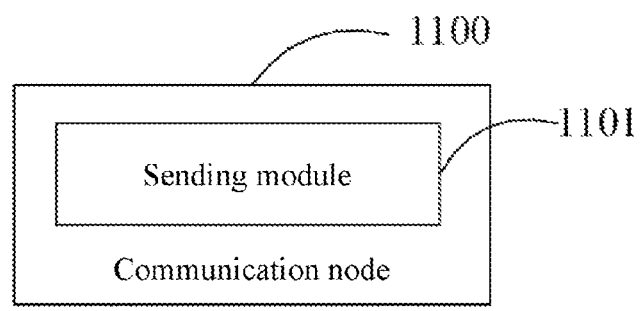
FIG. 11 is a structural diagram of another communication node according to an embodiment of the present disclosure.

FIG. 11 is a structural diagram of a communication node according to an embodiment of the present disclosure. The communication node is a second node. As shown in FIG. 11, the communication node 1100 includes:
a sending module 1101, configured to send first information, where the first information is used for indicating a transmission mode of a first node or the second node, where
the first node is a large intelligent surface LIS node or a hypersurface node or an intelligent emitting surface node, and the second node is an upper-level first node or a base station.

sending first information, where the first information is used for indicating a transmission mode of a first node or the second node, where
the first node is a large intelligent surface LIS node or a hypersurface node or an intelligent emitting surface node, and the second node is an upper-level first node or a base station.

In some embodiments, the first information is used for indicating at least one of the following transmission modes of the first node or the second node:
a periodic transmission mode and an aperiodic transmission mode.

In some embodiments, the periodic transmission mode is used for indicating at least one of at least one transmission mode and an inoperative transmission mode in one period; or
the aperiodic transmission mode is used for indicating a transmission mode or an inoperative transmission mode.

In some embodiments, the transmission mode is associated with a beam, or the transmission mode is associated with a transmission configuration indicator state.

In some embodiments, the first information is further used for indicating time information of at least a part of the transmission mode, or the first information is further used for indicating time information of the inoperative transmission mode.

In some embodiments, the first information includes N groups of bits, the one period includes N time units, each group of bits is used for indicating a transmission mode or an inoperative transmission mode in a corresponding time unit, each group of bits includes one or more bits, and N is an integer greater than or equal to 1.

In some embodiments, the at least one transmission mode includes a transmission mode of at least one downlink time resource, and further includes a transmission mode of an uplink time resource corresponding to the at least one downlink time resource, where the transmission mode of the uplink time resource is a transmission mode in the transmission mode of the at least one downlink time resource.

Figure 12:
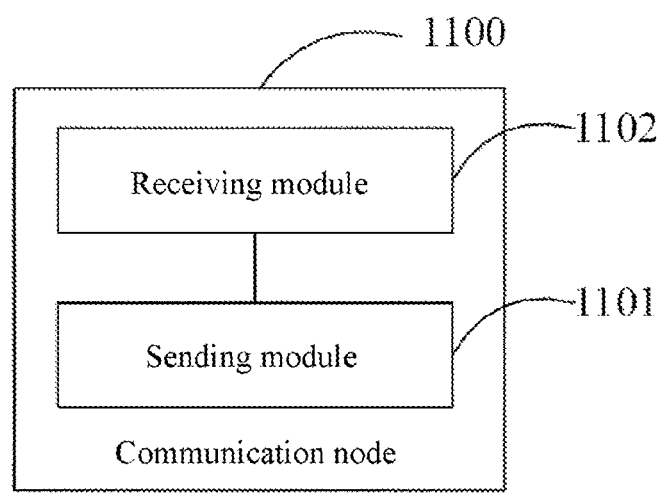
FIG. 12 is a structural diagram of another communication node according to an embodiment of the present disclosure.

In some embodiments, as shown in FIG. 12, the communications device 1100 further includes:
a receiving module 1102, configured to receive second information, where the second information is used for indicating a transmission mode expected by the first node.

In some embodiments, the transmission mode indicated by the first information is determined by the second node based on the transmission mode indicated by the second information.

Figure 13:
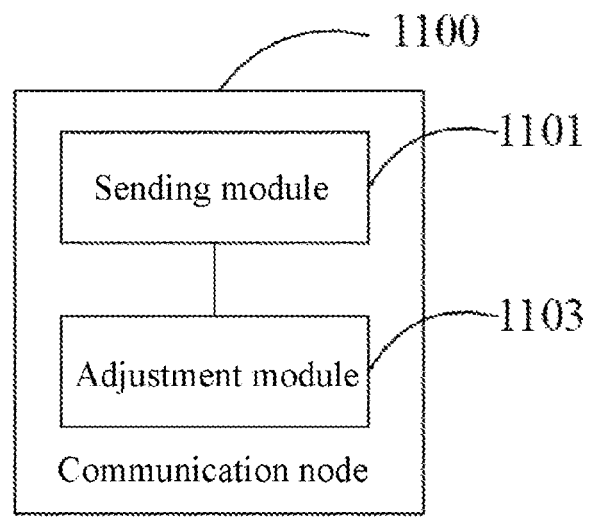
FIG. 13 is a structural diagram of another communication node according to an embodiment of the present disclosure.

In some embodiments, as shown in FIG. 13, the communications device 1100 further includes:
an adjustment module 1103, configured to adjust the transmission mode of the second node according to the first information.

In some embodiments, the adjusted time is a time determined by the second node, or an offset between the adjusted time and a sending time of the first information is equal to a target time.

In some embodiments, the transmission mode of the second node indicated by the first information corresponds to the transmission mode adopted by the first node to transmit a signal related to the second node, where
the signal related to the second node includes a signal sent by the second node or a signal sent to the second node.

The terminal provided in this embodiment of the present disclosure can implement the processes implemented by the second node in the method embodiment in FIG. 2. To avoid repetition, details are not repeated herein. In addition, the reliability of signal transmission can be improved.

Figure 14:
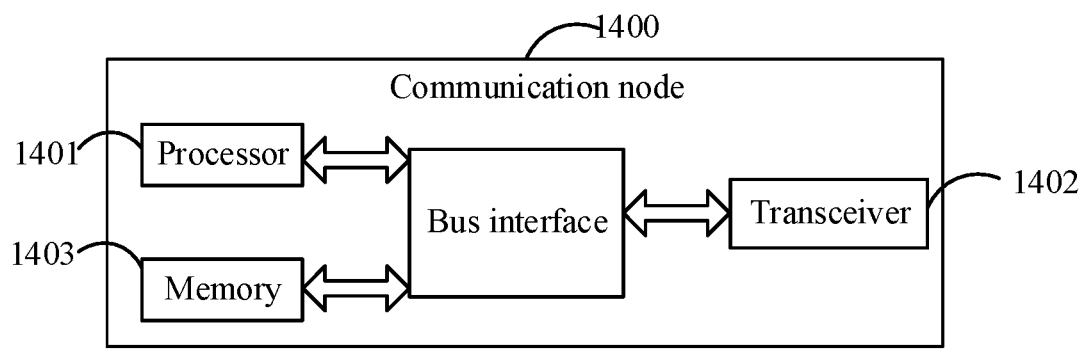
FIG. 14 is a structural diagram of another communication node according to an embodiment of the present disclosure.

FIG. 14 is a structural diagram of another communication node according to an embodiment of the present disclosure. As shown in FIG. 14, the communication device 1400 includes a processor 1401, a transceiver 1402, a memory 1403, and a bus interface.

In an embodiment in which the communication node is a first node:
a transceiver 1402 is configured to obtain first information, where the first information is used for indicating a transmission mode of the first node or a second node; and
the transceiver 1402 is further configured to transmit a signal related to the second node according to the transmission mode corresponding to the first information, where
the first node is a large intelligent surface LIS node or a hypersurface node or an intelligent emitting surface node, and the second node is an upper-level first node or a base station;
and the signal related to the second node includes a signal sent by the second node or a signal sent to the second node.

In some embodiments, the first information is used for indicating at least one of the following transmission modes of the first node or the second node:
a periodic transmission mode and an aperiodic transmission mode.

In some embodiments, the periodic transmission mode is used for indicating at least one of at least one transmission mode and an inoperative transmission mode in one period; or
the aperiodic transmission mode is used for indicating a transmission mode or an inoperative transmission mode.

In some embodiments, the transmission mode is associated with a beam, or the transmission mode is associated with a transmission configuration indicator state.

In some embodiments, the first information is further used for indicating time information of at least a part of the transmission mode, or the first information is further used for indicating time information of the inoperative transmission mode.

In some embodiments, the first information includes N groups of bits, the one period includes N time units, each group of bits is used for indicating a transmission mode or an inoperative transmission mode in a corresponding time unit, each group of bits includes one or more bits, and N is an integer greater than or equal to 1.

In some embodiments, the at least one transmission mode includes a transmission mode of at least one downlink time resource, and further includes a transmission mode of an uplink time resource corresponding to the at least one downlink time resource, where the transmission mode of the uplink time resource is a transmission mode in the transmission mode of the at least one downlink time resource.

In some embodiments, before the obtaining first information, the transceiver 1402 is further configured to:
send second information, where the second information is used for indicating a transmission mode expected by the first node.

In some embodiments, the transmission mode indicated by the first information is determined by the second node based on the transmission mode indicated by the second information.

In some embodiments, the processor 1401 is configured to:
adjust the transmission mode of the first node to the transmission mode corresponding to the first information according to the first information.

In some embodiments, the adjusted time is a time notified by the second node, or an offset between the adjusted time and a receiving time of the first information is equal to a target time.

In some embodiments, the transmission mode corresponding to the first information includes:
the transmission mode of the first node corresponding to the transmission mode of the second node indicated by the first information determined according to a mapping relationship, where
the mapping relationship is a mapping relationship between the transmission mode of the second node and the transmission mode of the first node.

In an embodiment in which the communication node is a second node:
a transceiver 1402, configured to send first information, where the first information is used for indicating a transmission mode of a first node or the second node; and
the first node is a large intelligent surface LIS node or a hypersurface node or an intelligent emitting surface node, and the second node is an upper-level first node or a base station.

In some embodiments, the first information is used for indicating at least one of the following transmission modes of the first node or the second node:
a periodic transmission mode and an aperiodic transmission mode.

In some embodiments, the periodic transmission mode is used for indicating at least one of at least one transmission mode and an inoperative transmission mode in one period; or the aperiodic transmission mode is used for indicating a transmission mode or an inoperative transmission mode.

In some embodiments, different transmission modes correspond to different beams.

In some embodiments, the first information is further used for indicating time information of at least a part of the transmission mode, or the first information is further used for indicating time information of the inoperative transmission mode.

In some embodiments, the first information includes N groups of bits, the one period includes N time units, each group of bits is used for indicating a transmission mode or an inoperative transmission mode in a corresponding time unit, each group of bits includes one or more bits, and N is an integer greater than or equal to 1.

In some embodiments, the at least one transmission mode includes a transmission mode of at least one downlink time resource, and further includes a transmission mode of an uplink time resource corresponding to the at least one downlink time resource, where the transmission mode of the uplink time resource is a transmission mode in the transmission mode of the at least one downlink time resource.

In some embodiments, before the sending first information, the transceiver 1402 is further configured to:
receive second information, where the second information is used for indicating a transmission mode expected by the first node.

In some embodiments, the transmission mode indicated by the first information is determined by the second node based on the transmission mode indicated by the second information.

In some embodiments, the processor 1401 is configured to:
adjust the transmission mode of the second node according to the first information.

In some embodiments, the adjusted time is a time determined by the second node, or an offset between the adjusted time and a sending time of the first information is equal to a target time.

In some embodiments, the transmission mode of the second node indicated by the first information corresponds to the transmission mode adopted by the first node to transmit a signal related to the second node, where
the signal related to the second node includes a signal sent by the second node or a signal sent to the second node.

The communication device can improve the communication quality between the communication device and the terminal.

The transceiver 1402 is configured to receive and transmit data under the control of the processor 1401, and the transceiver 1402 includes at least two antenna ports.

In FIG. 14, a bus architecture may include any quantity of interconnected buses and bridges, and connects together circuits that are of one or more processors represented by the processor 1401 and of a memory represented by the memory 1403. The bus architecture may further connect various other circuits such as a peripheral device, a voltage stabilizer, and a power management circuit. These are known in the art, and therefore are not further described in this specification. The bus interface provides an interface. The transceiver 1402 may be a plurality of components, including a transmitter and a receiver, and providing units for communicating with various other apparatuses on a transmission medium. For different UEs, the user interface 1404 may be an interface capable of externally or internally connecting a required device, the connected device includes, but not limited to, a keypad, a display, a speaker, a microphone, and a joystick.

The processor 1401 is responsible for the management of the bus architecture and normal processing, and the memory 1403 may store data used when the processor 1401 performs an operation.

The embodiments of the present disclosure further provide a communication node, including a processor 1401, a memory 1403, and a computer program stored on the memory 1403 and executable on the processor 1401, where the computer program, when executed by the processor 1401, implements the processes of the embodiment of the signal transmission method or information sending method, and the same technical effects can be achieved. To avoid repetition, details are not repeated herein.

The embodiments of the present disclosure provide a computer-readable storage medium, storing a computer program, where the computer program, when executed by a processor, implements the steps of the signal transmission method according to the embodiments of the present disclosure, or the computer program, when executed by a processor, implements the steps of the information sending method according to the embodiments of the present disclosure, and the same technical effects can be achieved. To avoid repetition, details are not repeated herein. The computer-readable storage medium may include a flash drive, a Read-Only Memory (ROM), a Random Access Memory (RAM), a magnetic disk, or an optical disc.

It should be noted that the term "include", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that for convenience and conciseness of description, for specific working processes of the foregoing described system, apparatus and unit, reference may be made to the corresponding processes in the foregoing method embodiments, and details are not described herein.

In the several embodiments provided in this application, it should be understood that the disclosed apparatus and method may be implemented in other manners. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the method according to the foregoing embodiments may be implemented using software and a necessary general hardware platform, and may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

A person skilled in the art may understand that all or some of the procedures of the methods of the foregoing embodiments may be implemented by a computer program controlling relevant hardware. The program may be stored in a computer-readable storage medium. When the program is executed, the procedures of the foregoing method embodiments may be implemented. The storage medium may be a magnetic disc, an optical disc, a ROM, or a RAM.

It may be understood that, the embodiments described in the embodiments of the present disclosure may be implemented by using software, hardware, firmware, middleware, microcode, or a combination thereof. For hardware implementation, a module, a unit, and a sub-unit may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general purpose processor, a controller, a micro-controller, a microprocessor, and other electronic units configured to execute the functions described in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented in the processor or outside the processor.

The embodiments of the present disclosure are described above with reference to the accompanying drawings, but the present disclosure is not limited to the foregoing specific implementations, which are merely illustrative rather than limited. Under the inspiration of the present disclosure, a person of ordinary skill in the art can make many forms without departing from the scope of the present disclosure and the protection of the claims, all of which fall within the protection of the present disclosure.

What is claimed is:

1. A signal transmission method, performed by a first node, comprising:
obtaining first information, wherein the first information is used for indicating a transmission mode of the first node or a transmission mode of a second node, wherein:
in response to the first information indicating the transmission mode of the first node, the first node directly uses the transmission mode of the first node; and
in response to the first information indicating the transmission mode of the second node, the first node determines the transmission mode of the first node according to the transmission mode of the second node based on a mapping relationship between the transmission mode of the second node and the transmission mode of the first node, wherein the mapping relationship is pre-configured or predefined in a protocol; and
transmitting a signal related to the second node according to the transmission mode of the first node, wherein:
the first node is a Large Intelligent Surface (LIS) node or a hypersurface node or an intelligent emitting surface node,
the second node is an upper-level first node or a base station, and
the signal related to the second node comprises a signal sent by the second node or a signal to be sent to the second node, wherein:
when the signal related to the second node includes a signal sent by the second node, the transmitting the signal related to the second node comprises: sending the signal to the terminal; or
when the signal related to the second node includes a signal to be sent to the second node, the transmitting the signal related to the second node comprises: sending the signal to the second node.

2. The signal transmission method according to claim 1, wherein the transmission mode comprises a periodic transmission mode or an aperiodic transmission mode, wherein:
the periodic transmission mode is used for indicating at least one of at least one transmission mode or an inoperative transmission mode in one period; or
the aperiodic transmission mode is used for indicating a transmission mode or an inoperative transmission mode.

3. The signal transmission method according to claim 1, wherein the transmission mode is associated with a beam, or the transmission mode is associated with a transmission configuration indicator state.

4. The signal transmission method according to claim 2, wherein the first information is further used for indicating time information of at least a part of the transmission mode, or the first information is further used for indicating time information of the inoperative transmission mode;
wherein:
the first information comprises N groups of bits,
the one period comprises N time units,
each group of bits is used for indicating a transmission mode or an inoperative transmission mode in a corresponding time unit,
each group of bits comprises one or more bits, and
N is an integer greater than or equal to 1.

5. The signal transmission method according to claim 2, wherein the at least one transmission mode comprises a transmission mode of at least one downlink time resource, and further comprises a transmission mode of an uplink time resource corresponding to the at least one downlink time resource, wherein the transmission mode of the uplink time resource is a transmission mode in the transmission mode of the at least one downlink time resource.

6. The signal transmission method according to claim 1, wherein before the obtaining first information, the method further comprises:
sending second information, wherein the second information is used for indicating a transmission mode expected by the first node.

7. The signal transmission method according to claim 1, further comprising:
adjusting the transmission mode of the first node to the transmission mode corresponding to the first information according to the first information.

8. The signal transmission method according to claim 7, wherein an adjusted time is a time notified by the second node, or an offset between the adjusted time and a receiving time of the first information is equal to a target time.

9. An information sending method, performed by a second node, comprising:
sending first information, wherein the first information is used for indicating a transmission mode of a first node or a transmission mode of the second node, wherein:
in response to the first information indicating the transmission mode of the first node, the first node directly uses the transmission mode of the first node; and
in response to the first information indicating the transmission mode of the second node, the first node determines the transmission mode of the first node according to the transmission mode of the second node based on a mapping relationship between the transmission mode of the second node and the transmission mode of the first node, wherein the mapping relationship is pre-configured or predefined in a protocol; and
the first node is a Large Intelligent Surface (LIS) node or a hypersurface node or an intelligent emitting surface node, and the second node is an upper-level first node or a base station,
wherein the method further comprises:
sending a signal to the first node, so that the first node forwards the signal to a terminal according to the transmission mode of the first node; or
receiving a signal sent by the first node according to the transmission mode corresponding to the first information.

10. The information sending method according to claim 9, wherein the transmission mode comprises a periodic transmission mode or an aperiodic transmission mode, wherein:
the periodic transmission mode is used for indicating at least one of at least one transmission mode or an inoperative transmission mode in one period; or
the aperiodic transmission mode is used for indicating a transmission mode or an inoperative transmission mode.

11. The information sending method according to claim 9, wherein the transmission mode is associated with a beam, or the transmission mode is associated with a transmission configuration indicator state.

12. The information sending method according to claim 10, wherein the first information is further used for indicating time information of at least a part of the transmission mode, or the first information is further used for indicating time information of the inoperative transmission mode;
wherein:
the first information comprises N groups of bits,
the one period comprises N time units,
each group of bits is used for indicating a transmission mode or an inoperative transmission mode in a corresponding time unit,
each group of bits comprises one or more bits, and
N is an integer greater than or equal to 1.

13. The information sending method according to claim 10, wherein the at least one transmission mode comprises a transmission mode of at least one downlink time resource, and further comprises a transmission mode of an uplink time resource corresponding to the at least one downlink time resource, wherein the transmission mode of the uplink time resource is a transmission mode in the transmission mode of the at least one downlink time resource.

14. The information sending method according to claim 9, wherein before the sending first information, the method further comprises:
receiving second information, wherein the second information is used for indicating a transmission mode expected by the first node.

15. The information sending method according to claim 9, further comprising:
adjusting the transmission mode of the second node according to the first information.

16. The information sending method according to claim 15, wherein the adjusted time is a time determined by the second node, or an offset between the adjusted time and a sending time of the first information is equal to a target time.

17. The information sending method according to claim 9, wherein the transmission mode of the second node indicated by the first information corresponds to the transmission mode adopted by the first node to transmit a signal related to the second node, wherein
the signal related to the second node comprises the signal sent by the second node to the first node or the signal sent by the first node to the second node.

18. A communication node, comprising a first node, wherein the first node comprises: a memory having a computer program stored thereon, and a processor, wherein the computer program, when executed by the processor, causes the processor to perform operations comprising:
obtaining first information, wherein the first information is used for indicating a transmission mode of the first node or a transmission mode of a second node, wherein:
in response to the first information indicating the transmission mode of the first node, the first node directly uses the transmission mode of the first node; and
in response to the first information indicating the transmission mode of the second node, the first node determines the transmission mode of the first node according to the transmission mode of the second node based on a mapping relationship between the transmission mode of the second node and the transmission mode of the first node, wherein the mapping relationship is pre-configured or predefined in a protocol; and
transmitting a signal related to the second node according to the transmission mode of the first node,
wherein:
the first node is a Large Intelligent Surface (LIS) node or a hypersurface node or an intelligent emitting surface node,
the second node is an upper-level first node or a base station, and
the signal related to the second node comprises a signal sent by the second node or a signal to be sent to the second node, wherein:
when the signal related to the second node includes a signal sent by the second node, the transmitting the signal related to the second node comprises: sending the signal to the terminal; or
when the signal related to the second node includes a signal to be sent to the second node, the transmitting the signal related to the second node comprises: sending the signal to the second node.

19. A communication node, comprising a second node, wherein the second node comprises: a memory having a computer program stored thereon, and a processor, wherein the computer program, when executed by the processor, causes the processor to perform the information sending method of claim 9.

* * * * *